Oct. 26, 1965  D. C. WRIGHT ETAL  3,213,740
CANTILEVER SUPPORT ROLLER DIE APPARATUS
Filed Oct. 17, 1962  2 Sheets-Sheet 1

INVENTORS
DAVID C. WRIGHT
ASHTON L. WORRALL JR
BY
Oldham & Oldham
ATTYS.

Oct. 26, 1965  D. C. WRIGHT ETAL  3,213,740
CANTILEVER SUPPORT ROLLER DIE APPARATUS
Filed Oct. 17, 1962  2 Sheets-Sheet 2
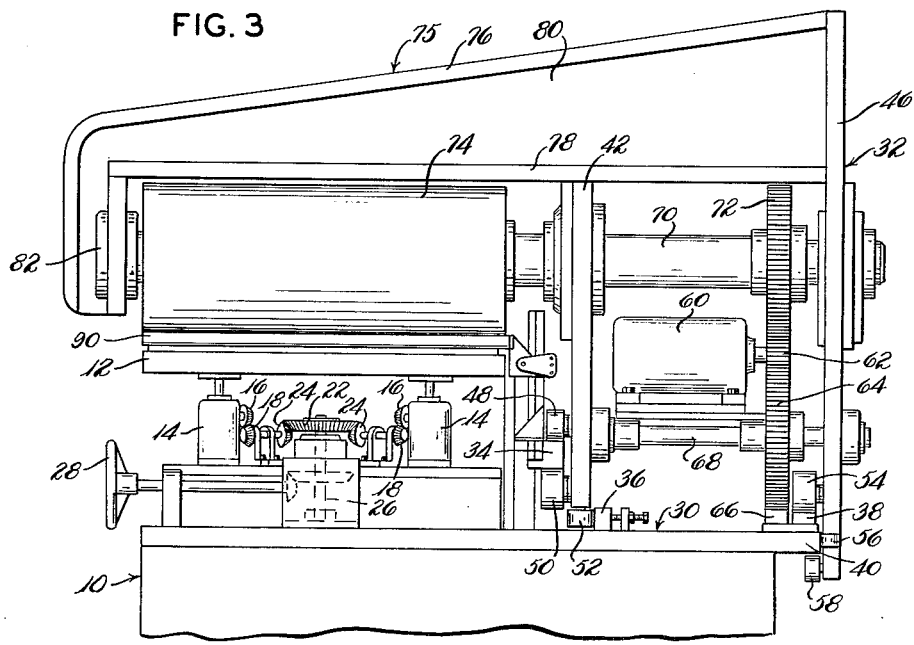
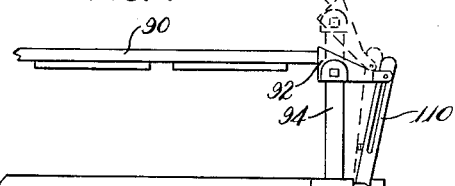
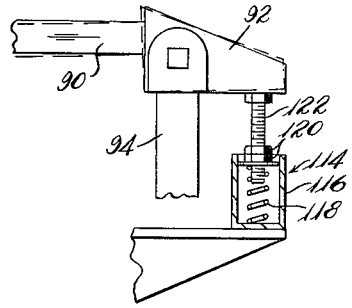
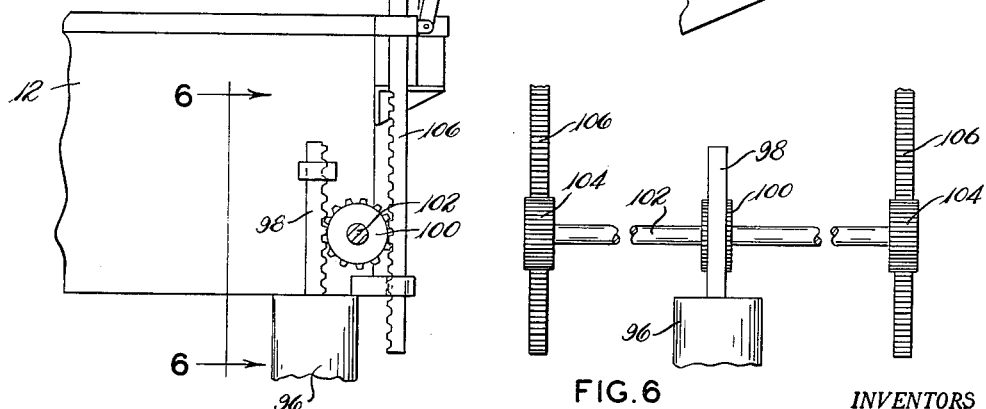
INVENTORS
DAVID C. WRIGHT
ASHTON L. WORRALL JR.
BY Dedham & Dedham
ATTYS.

United States Patent Office 3,213,740
Patented Oct. 26, 1965

3,213,740
CANTILEVER SUPPORT ROLLER DIE APPARATUS
David C. Wright and Ashton L. Worrall, Jr., Cuyahoga Falls, Ohio, assignors to Falls Engineering & Machine Company, Cuyahoga Falls, Ohio
Filed Oct. 17, 1962, Ser. No. 231,098
10 Claims. (Cl. 83—564)

This invention relates to roller die apparatus, and, more particularly, is concerned with apparatus of this type in which the roller is supported at one side so as to leave the other side of the apparatus open to facilitate all functions of an operator of the apparatus.

It has been proposed therefore to provide roller die apparatus, such as shown in U.S. Patent No. 2,772,736, wherein a roller is utilized to progressively press material to be cut against a cutting die. However, in known apparatus the roller has been supported at both ends in guiding and/or driving means so that access by the operator to the cutting die or the cut material has been difficult. In addition, the apparatus has been relatively heavy and expensive, as well as consuming of floor space, so that the apparatus has not adapted itself well to many relatively light cutting operations.

It is the general object of the present invention to avoid and overcome the foregoing and other difficulties of and objections to prior art practices by the provision of a relatively inexpensive and efficient apparatus adapted to perform a wide variety of cutting actions, and in which the roller die is supported by a carriage at one side only of the roller die bed so as to leave the other side open whereby the various functions of an operator, including loading and unloading of the apparatus, are facilitated.

Another object of the invention is the provision of roller die apparatus in which the construction has been simplified to make it lighter in weight, less space consuming, and less expensive, but with the apparatus adapted to perform a wide variety of cutting and dieing operations on a variety of materials.

Another object of the invention is the provision in apparatus of the character described of flexible die means having downwardly directed cutting edges and adapted to be moved to a position above the material receiving bed of the apparatus, the die means then being moved down against the material to clamp it in position on the bed, followed by the movement of the roller over the top of the flexible die to effect the cutting operation.

Another object of the invention is to provide flexible die means, as described, supported at the side of the apparatus adjacent the roll supporting carriage, the die apparatus having its edge remote from its support being biased resiliently towards the bed, and with mechanism being provided for automatically raising the die means from the material after a cutting operation, and for tilting the die means upwardly from its support to better expose the die means for the removal of any die cut articles therefrom.

The foregoing objects of the invention, and other objects which will become apparent as the description proceeds, are achieved by roller die cutting apparatus including a bed, a track along one side only of the bed so as to leave the other side of the bed open for operator manipulations of material on the bed, a carriage on the track, means for moving the carriage back and forth on the track, a roller, means mounted on the carriage and journalling the roller for rolling movement over the top of the bed and leaving said other side of the bed open, means for adjusting the clearance between the roller and the bed, a relatively thin flexible cutting die, means at said one side of the bed for supporting the die substantially parallel to the bed and for moving the die to and from the bed, means for tilting the die supporting means away from the bed near the end of the movement of the die away from the bed, and means for resiliently biasing the side of the die remote from its supporting means towards the bed upon movement of the die towards the bed.

Referring to the drawings:

FIG. 3 is an end elevation of the apparatus of FIG. 1;

FIG. 4 is a fragmentary vertical cross-sectional view illustrating details of the mechanism for lifting and tilting the flexible die;

FIG. 5 is an enlarged fragmentary view of the mechanism for biasing the unsupported edge of the flexible die towards the material supporting bed; and FIG. 6 is a fragmentary view, taken substantially on line 6—6 of FIG. 4.

Figures 1, 2:
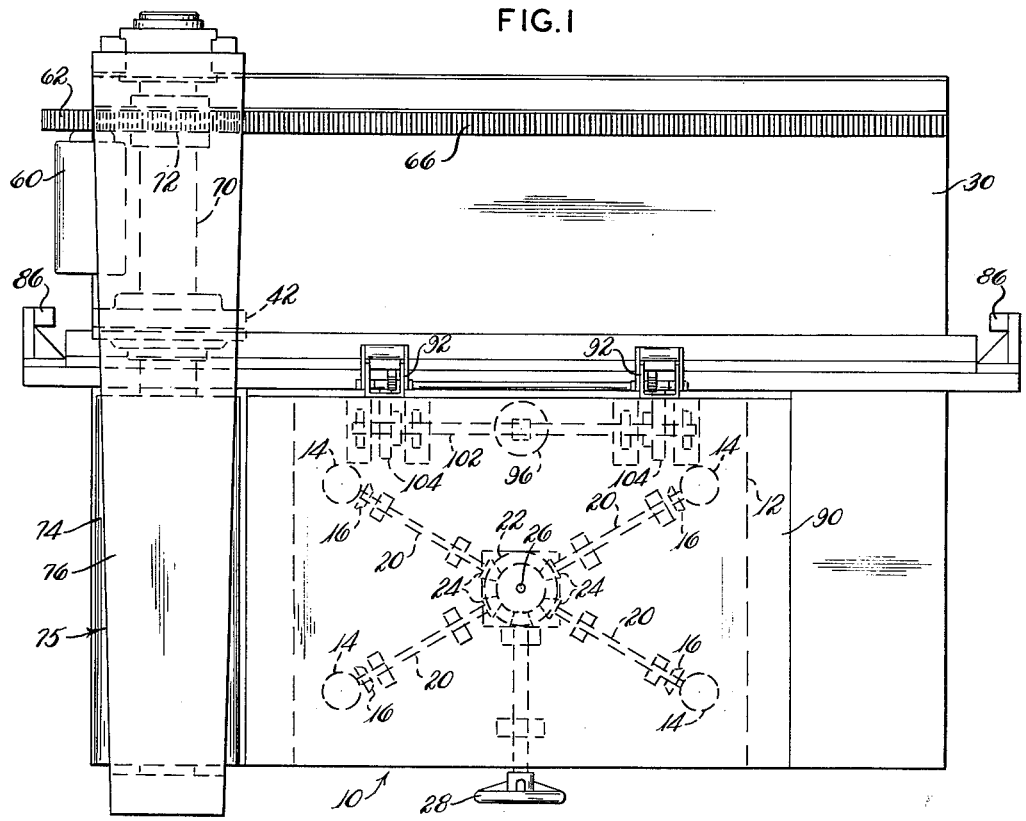
FIG. 1 is a plan view of apparatus incorporating the principles of the invention.
FIG. 2 is a side elevation of the apparatus of FIG. 1.

In the drawings, the numeral 10 indicates generally a base which supports substantially horizontally a material receiving bed 12. The vertical height of the bed 12 above the base 10 is adjustable and typical mechanism to effect this function and may include a plurality of screw jacks 14, one positioned at each corner of the bed 12 and mounted on the base 10. Each screw jack 14 carries a miter gear 16, and the miter gears 16 are engaged by miter gears 18 carried on shafts 20 extending outwardly from a bevel gear 22 which engages with miter gears 24 on the innermost ends of the shafts 20. The bevel gear 22 is carried at the upper end of a shaft 26 driven through bevel gearing by a hand wheel 28. In this manner vertical height of the bed 12 above the base 10 can be adjusted upon rotation of the hand wheel 28.

Positioned at one side of the base 10 and the bed 12 is a track, indicated as a whole by the numeral 30 upon which is slidably mounted for reciprocated driven movement a carriage indicated as a whole by the numeral 32. More particularly, the track 30 includes guide rails 34, 36, 38, and 40 extending the full length of the base 10. The carriage 32 normally includes vertically extending parallel plates 42 and 46. The plate 42 of the carriage 32 journals rollers 48 engaging with the top of the guide rail 34, rollers 50 engaging with the bottom of the guide rail 34 and rollers 52 engaging with the side of the guide rail 36. The plate 46 of the carriage 32 journals rollers 54 engaging with the top of the guide rail 38, rollers 56 engaging with the edge of the guide rail 40, and rollers 58 engaging with the bottom of the guide rail 40.

Mounted in the carriage 32 are means for driving the carriage back and forth on the track 30, and these means may include a hydraulic motor 60 driving a pinion 62 which drives through an idler gear 64 to a rack 66 mounted at the bottom of the track 30. The idler gear 64 is carried upon a shaft 68 journalled at its ends in the plates 42 and 46 of the carriage 32.

The carriage 32 likewise journals a shaft 70 which extends out in cantilever fashion over the top of the bed 12. The shaft 70 is preferably driven, and this can be achieved by providing a gear 72 on the shaft, this gear likewise engaging with the pinion 62 mounted upon the operating shaft of the hydraulic motor 60.

The shaft 70 carries a roller 74 of a length substantially equal to the width of the bed 12, with the roller 74 functioning to cut progressively material positioned upon the bed 12, all as hereinafter described in detail.

In the preferred practice of the invention the outboard and cantilever end of the shaft 70 is rotatably supported by a cantilever mounted bearing, and for this purpose the plate 46 is normally made of the shape shown in FIG. 3 of the drawings so as to extend above the top of the plate 42. An I-beam arm or section, tapering outwardly both in elevation and plan views is provided extending from the extension of the plate 46 and the top of the carriage 32 out to the end of the shaft 70. The I-beam, indicated as a whole by the numeral 75 includes a top plate 76, a bottom plate 78 and a connecting centrally positioned vertical web 80, the I-beam extending downwardly at its outer end to support a bearing 82 for the outer end of the shaft 70.

Although not preferred, the I-beam arm 75 can be eliminated from the apparatus with the shaft 70 functioning to support the roller 74 in cantilever fashion. Additionally, in certain embodiments of the apparatus it is possible to mount the roller 74 on the shaft 70 so that the roller is free to rotate on the shaft, and in this form of the apparatus, which is not preferred, it is not necessary to drive the shaft 70.

As best seen in FIG. 1, the track 30 includes stops 86 for limiting the movement of the carriage 32 on the track, and limit switch means (not shown) may likewise be provided for this purpose.

The apparatus of the invention normally includes a relatively thin flexible die of the type disclosed and claimed in U.S. Patent No. 3,049,039. This die can be positioned upon the bed 12 with the cutting edges upwardly so that the material to be cut can be placed over the top of the die followed by the progressive movement of the roller over the material to cut it against the die. However, in the preferred practice of the invention, the relatively thin flexible die, indicated in the drawings by the numeral 90, is adapted to be mounted for movement toward and from the bed 12, and with the cutting edges of the die extending downwardly. In this form of the invention, the material to be cut is positioned down against the bed 12, the die 90 is lowered against the material to clamp it on the bed, and the roller 74 is then progressively passed over the upper surface of the die 90 to effect the die cutting of the material.

Referring now to FIGS. 3 through 6 of the drawings, which illustrate the preferred manner of mounting the die 90, the die 90 is pivotally secured for limited movement by brackets 92 to vertically slidable posts 94 positioned at the corners of the die 90 adjacent the track 30. The posts 94 are adapted to be raised and lowered by suitable mechanism such as a fluid pressure cylinder 96 operating to drive a rack 98 engaging with a pinion 100 carried upon a shaft 102 journalled on the base 10 of the apparatus. The shaft 102 has pinion 104 secured to it at its ends and these pinions drive racks 106 formed in or mounted on the lower ends of the posts 94. In this manner the operation of the fluid pressure motor 96 raises the flexible die 90 away from the bed 12 or acts to move the die towards the bed 12 to clamp material against the bed.

In a preferred embodiment of the apparatus the die 90 is adapted to be tilted away from the bed 12 during the final stage of the movement of the die away from the bed, and this is accomplished, as best seen in FIG. 4, by providing lost motion pivotal links 110 between the brackets 92 and the bed 12. These lost motion links 110 allow the movement of the die 90 towards and from the bed 12, but upon the final stage of movement of the die 90 away from the bed the links act to tilt the brackets 92 and the die 90 into the dotted line position of FIG. 4 to thereby allow better servicing, loading and unloading, cleaning, and the like, of the die 90 between the cutting operations thereof.

Inasmuch as the die 90 is supported only at its edge adjacent the track 30 of the apparatus during the clamping movement of the die 90 to clamp material to be cut against the bed 12 the unsupported end of the die 90 tends to curl or spring away from positive clamping engagement with the material. To compensate against and to substantially overcome this springing movement, a selected number, usually two, of the mechanism of FIG. 5 are provided to resiliently bias the unsupported side of the die 90 towards the bed 12 upon the clamping movement of the die towards the bed. FIG. 5 illustrates that the brackets 92 pivotally securing the die 90 to the vertically movable posts 94 act to engage adjustable resilient stops, indicated as a whole by the numeral 114 during the final stages of the clamping movement of the die 90. These resilient stops 114 act to bias the brackets 92 and the die 90 towards the dotted line position shown in FIG. 5 to thereby make the outer edge of the die 90 remote from the track 30 first engage with the material to be clamped against the bed 12. This has been found to result in a better cutting action on the material when the roller 74 is passed over the upper surface of the die 90. The resilient stop means 114 yield downwardly under the rolling movement of the roller 74.

Each resilient stop 114 includes a cylindrical casing 116 slidably receiving a compression spring 118. The upper end of the spring 118 engages with adjustable nuts 120 slidably received in and guided by the casing 116, the nuts 120 being carried upon a cap screw 122, the upper end of which engages with the bracket 92.

It is believed that the operation of the apparatus of the invention will be understood from the foregoing description. Suffice it to say here that one side of the bed 12 is freely accessible to the operator of the apparatus without interference from the roller supporting and driving mechanisms. With the die 90 raised out to the way by operation of fluid pressure motor 96, the operator can place material to be cut on the bed 12, this action being facilitated by material feeding means (not shown) should this be desirable. With the material to be cut on the bed 12 the die 90 is moved down to clamp the material on the bed, and at this time the resilient stop means 114 function to resiliently bias the outer edge of the die 90 towards the bed 12. Now the motor means 60 on the carriage 32 are energized to drive the roller 74 over the upper surface of the die 90 to effect the progressive cutting action between the die and the material. It will be noted that the clearance between the bed 12 and the roller 74 can be adjusted by means of the hand wheel 28 so that the best possible type of cutting action is provided. It is normally necessary to move the carriage 32 only in one direction along the track 30 to effect the cutting of the material by the die, and with the return movement of the carriage effecting a second cutting operation upon newly positioned material, as will be understood. Once the roller 74 has made its cutting movement over the top of the die, and is positioned beyond the end of the bed 12 and die 90, the fluid motor means 96 are operated to raise the die 90 and tilt it out of the way so that a new length of material to be cut can be moved onto the bed 12.

While a certain representative embodiment and details have been shown for the purpose of illustrating the invention, it will be apparent to those skilled in this art that various changes and modifications may be made therein without departing from the spirit or scope of the invention.

What is claimed is:

1. In apparatus for die cutting materials a base, a bed on the base, means adjustably supporting the bed on the base for movement to and from the base while maintaining the top of the bed in a substantially horizontal position, a carriage, means slidably mounting the carriage on the base at one side of the bed only for movement along one side of the bed to thereby leave the other side of the bed open and freely accessible, a shaft journalled in the carriage and extending out over the top of the bed in position parallel thereto, a roller carried by the shaft above the bed, a cantilever arm secured to the carriage and extending out over the top of the shaft and roller and rotatably supporting the shaft at its outer end remote from the carriage, a rack on the bed beneath the carriage, a motor on the carriage, gear means connecting the motor with the rack and shaft whereby operation of the motor advances the carriage along the side of the bed and simultaneously drives the roller, flexible flat die means, a pair of rods mounted for vertical sliding movement in the base and pivotally supporting the die means only at the side adjacent the carriage and in a substantially horizontal position above the bed, means mounted in the base for moving the rods vertically to clamp material to be cut against the bed or to move the die means away from the bed, links limiting the movement of the die means away from the bed and for tilting the die means away from the bed at the end of the limiting movement, and adjustable resilient means effective upon the movement of the die means to clamp material to be cut against the bed for resiliently biasing towards the bed that side of the die means remote from the side upon which it is pivotally supported.

2. In apparatus for die cutting materials a base, a bed on the base, means adjustably supporting the bed on the base for movement to and from the base while maintaining the top of the bed in a substantially horizontal position, a carriage, means slidably mounting the carriage on the base at one side of the bed only for movement along one side of the bed to thereby leave the other side of the bed open and freely accessible, a shaft journalled in the carriage and extending out over the top of the bed in position parallel thereto, a roller carried by the shaft above the bed, a cantilever arm secured to the carriage and extending out over the top of the shaft and roller and rotatably supporting the shaft at its outer end remote from the carriage, a rack on the bed beneath the carriage, means for driving the carriage back and forth along the side of the bed, flexible flat die means, a pair of rods mounted for vertical sliding movement and pivotally supporting the die means only at the side adjacent the carriage and in a substantially horizontal position above the bed, means for moving the rods vertically to clamp material to be cut against the bed or to move the die means away from the bed, links limiting the movement of the die means away from the bed and for tilting the die means away from the bed at the end of the limiting movement, and adjustable resilient means effective upon the movement of the die means to clamp material to be cut against the bed for resiliently biasing towards the bed that side of the die means remote from the side upon which it is pivotally supported.

3. In apparatus for die cutting materials a base, a bed on the base, means adjustably supporting the bed on the base for movement to and from the base while maintaining the top of the bed in a substantially horizontal position, a carriage, means slidably mounting the carriage on the base at one side of the bed only for movement along one side of the bed to thereby leave the other side of the bed open and freely accessible, a shaft mounted in the carriage and extending out over the top of the bed in position parallel thereto, a roller carried by the shaft above the bed, a rack on the bed beneath the carriage, means for driving the carriage back and forth along the side of the bed, flexible flat die means, a pair of rods mounted for vertical sliding movement and pivotally supporting the die means only at the side adjacent the carriage and in a substantially horizontal position above the bed, means for moving the rods vertically to clamp material to be cut against the bed or to move the die means away from the bed, links limiting the movement of the die means away from the bed and for tilting the die means away from the bed at the end of the limiting movement, and adjustable resilient means effective upon the movement of the die means to clamp material to be cut against the bed for resiliently biasing towards the bed that side of the die means remote from the side upon which it is pivotally supported.

4. In apparatus for die cutting materials a base, a bed on the base, means adjustably supporting the bed on the base for movement to and from the base while maintaining the top of the bed in a substantially horizontal position, a carriage, means slidably mounting the carriage on the base at one side of the bed only for movement along one side of the bed to thereby leave the other side of the bed open and freely accessible, a shaft mounted in the carriage and extending out over the top of the bed in position parallel thereto, a roller carried by the shaft above the bed, a rack on the bed beneath the carriage, means for driving the carriage back and forth along the side of the bed, flexible flat die means, means mounted for vertical sliding movement and pivotally supporting the die means only at the side adjacent the carriage and in a substantially horizontal position above the bed, means for moving the mounting means vertically to clamp material to be cut against the bed or to move the die means away from the bed, means limiting the movement of the die means away from the bed and for tilting the die means away from the bed at the end of the limiting movement, and adjustable resilient means effective upon the movement of the die means to clamp material to be cut against the bed for resiliently biasing towards the bed that side of the die means remote from the side upon which it is pivotally supported.

5. In apparatus for die cutting materials a base, a bed on the base, means adjustably supporting the bed on the base for movement to and from the base while maintaining the top of the bed in a substantially horizontal position, a carriage, means slidably mounting the carriage on the base at one side of the bed only for movement along one side of the bed to thereby leave the other side of the bed open and freely accessible, a shaft mounted in the carriage and extending out over the top of the bed in position parallel thereto, a roller carried by the shaft above the bed, a rack on the bed beneath the carriage, means for driving the carriage back and forth along the side of the bed, flexible flat die means, means mounted for vertical sliding movement and pivotally supporting the die means only at the side adjacent the carriage and in a substantially horizontal position above the bed, means for moving the mounting means vertically to clamp material to be cut against the bed or to move the die means away from the bed, and means limiting the movement of the die means away from the bed and for tilting the die means away from the bed at the end of the limiting movement.

6. In apparatus for die cutting materials a base, a bed on the base, means adjustably supporting the bed on the base for movement to and from the base while maintaining the top of the bed in a substantially horizontal position, a carriage, means slidably mounting the carriage on the base at one side of the bed only for movement along one side of the bed to thereby leave the other side of the bed open and freely accessible, a shaft mounted in the carriage and extending out over the top of the bed in position parallel thereto, a roller carried by the shaft above the bed, a rack on the bed beneath the carriage, means for driving the carriage back and forth along the side of the bed, flexible flat die means, means mounted for vertical sliding movement and pivotally supporting the die means only at the side adjacent the carriage and in a substantially horizontal position above the bed, means for moving the mounting means vertically to clamp material to be cut against the bed or to move the die means away from the bed, and adjustable resilient means effective upon the movement of the die means to clamp material to be cut against the bed for resiliently biasing towards the bed that side of the die means remote from the side upon which it is pivotally supported.

7. Roller die cutting apparatus including a bed, a track along one side only of the bed so as to leave the other side of the bed open for operator manipulations of material on the bed, a carriage on the track, means for moving the carriage back and forth on the track, a roller, means mounted on the carriage and journalling the roller for rolling movement over the top of the bed and leaving said other side of the bed open, means for adjusting the clearance between the roller and the bed, a relatively thin flexible cutting die, means at said one side of the bed for pivotally supporting the die substantially parallel to the bed and for moving the die to and from the bed, means operatively affixed to last said means for tilting the die supporting means about its pivotal support and away from the bed near the end of the movement of the die away from the bed, and means for resiliently biasing the side of the die remote from its supporting means towards the bed upon movement of the die towards the bed.

8. Roller die cutting apparatus including a bed, a track along one side only of the bed so as to leave the other side of the bed open for operator manipulations of material on the bed, a carriage on the track, means for moving the carriage back and forth on the track, a roller, means mounted on the carriage and journalling the roller for rolling movement over the top of the bed and leaving said other side of the bed open, means for adjusting the clearance between the roller and the bed, a relatively thin flexible cutting die, means at said one side of the bed for supporting the die substantially parallel to the bed and for moving the die to and from the bed, and means for resiliently biasing the side of the die remote from its supporting means towards the bed upon movement of the die towards the bed.

9. In an apparatus for die cutting materials, a base, a bed on the base, means adjustably supporting the bed on the base for movement to and from the base while maintaining the top of the bed in a substantially horizontal position, a carriage, means slidably mounting the carriage on the base for movement along the bed, a shaft mounted in the carriage and extending across the top of the bed in position parallel thereto, a roller carried by the shaft above the bed, a rack on the bed beneath the carriage, means for driving the carriage back and forth along the side of the bed, flexible flat die means, means mounted for vertical sliding movement and pivotally supporting the die means in a substantially horizontal position above the bed, means for moving the mounting means vertically to clamp material to be cut against the bed or to move the die means away from the bed, and adjustable resilient means effective upon the movement of the die means to clamp material to be cut against the bed for resiliently biasing towards the bed that side of the die means remote from the side upon which it is pivotally supported.

10. In an apparatus for die cutting materials, a base, a bed on the base, means adjustably supporting the bed on the base for movement to and from the base while maintaining the top of the bed in a substantially horizontal position, a carriage, means slidably mounting the carriage on the base for movement along the bed, a shaft mounted in the carriage and extending across the top of the bed in position parallel thereto, a roller carried by the shaft above the bed, a rack on the bed beneath the carriage, means for driving the carriage back and forth along the side of the bed, flexible flat die means, means mounted for vertical sliding movement and pivotally supporting the die means in a substantially horizontal position above the bed, means for moving the mounting means vertically to clamp material to be cut against the bed or to move the die means away from the bed, and means limiting the movement of the die means away from the bed and for tilting the die means away from the bed at the end of the limiting movement.

References Cited by the Examiner
UNITED STATES PATENTS

| | | | |
|---|---|---|---|
| 330,913 | 11/85 | Maxfield | 83—510 |
| 2,217,060 | 10/40 | Korsen | 83—510 X |
| 2,359,034 | 9/44 | Grandstedt | 83—512 |
| 3,077,807 | 2/63 | Wright | 83—532 |

FOREIGN PATENTS 1,511 1/89 Great Britain.

ANDREW R. JUHASZ, *Primary Examiner.*